United States Patent
Rautiainen et al.

(10) Patent No.: US 10,398,962 B2
(45) Date of Patent: Sep. 3, 2019

(54) ELECTRICALLY POWERED TRANSPORT VEHICLE WITH A LIGHTING SYSTEM

(71) Applicant: Boosted, Inc., Mountain View, CA (US)

(72) Inventors: Jukka Rautiainen, Cupertino, CA (US); Levi Jacob Price, Sunnyvale, CA (US); Oliver Riihiluoma, San Francisco, CA (US); Asa Weiss, Santa Rosa, CA (US); Angus Peart, San Francisco, CA (US); Barrett Heyneman, San Jose, CA (US); Shelby Noonan, Los Gatos, CA (US); Chris Rieger, Brookfield (AU); John Ulmen, Emerald Hills, CA (US)

(73) Assignee: Boosted, Inc., Mountain View, CA (US)

( * ) Notice: Subject to any disclaimer, the term of this patent is extended or adjusted under 35 U.S.C. 154(b) by 0 days.

(21) Appl. No.: 15/893,126

(22) Filed: Feb. 9, 2018

(65) Prior Publication Data
US 2019/0091554 A1    Mar. 28, 2019

Related U.S. Application Data

(60) Provisional application No. 62/563,551, filed on Sep. 26, 2017.

(51) Int. Cl.
*A63C 17/12* (2006.01)
*A63C 17/26* (2006.01)
(Continued)

(52) U.S. Cl.
CPC ........ *A63C 17/017* (2013.01); *A63C 17/0006* (2013.01); *A63C 17/01* (2013.01);
(Continued)

(58) Field of Classification Search
CPC ..... A63C 17/26; A63C 17/0006; A63C 17/01; A63C 17/12; A63C 2203/12;
(Continued)

(56) References Cited

U.S. PATENT DOCUMENTS 8,038,313 B1 * 10/2011 Campbell ............. F21V 33/008
                                                              362/183
D670,419 S     11/2012 Fissell
(Continued)

FOREIGN PATENT DOCUMENTS

WO      2014152951 A1    9/2014

*Primary Examiner* — John D Walters
(74) *Attorney, Agent, or Firm* — Rutan & Tucker, LLP

(57) ABSTRACT

A personal transport system is provided including, in an embodiment, an electrically powered vehicle, a companion remote control, and a companion mobile phone application. The vehicle includes an operator-supporting deck, one or more deck-mounted trucks, one or more axle-mounted wheels on each of the one or more trucks, one or more batteries, and a deck lighting system. The one or more batteries power a motor configured to drive the wheels by way of a pulley system, at least one battery of which is disposed under a battery enclosure. The battery enclosure has a first light indicator system, and the companion remote control has a second light indicator system, each of which is configured for communicating with the operator. The deck lighting system includes a light strip of light-emitting diodes disposed in a groove of the deck configured to change state to communicate with the operator or others sharing a road.

21 Claims, 9 Drawing Sheets

(51) Int. Cl.
*A63C 17/01* (2006.01)
*H01M 2/10* (2006.01)
*B60L 11/18* (2006.01)
*A63C 17/00* (2006.01)
*B32B 17/06* (2006.01)
*B32B 5/24* (2006.01)

(52) U.S. Cl.
CPC ............ *A63C 17/015* (2013.01); *A63C 17/12* (2013.01); *A63C 17/26* (2013.01); *B60L 11/1868* (2013.01); *B60L 11/1877* (2013.01); *H01M 2/1083* (2013.01); *A63C 2203/12* (2013.01); *A63C 2203/14* (2013.01); *A63C 2203/42* (2013.01); *B32B 5/245* (2013.01); *B32B 17/062* (2013.01); *B32B 17/064* (2013.01); *B32B 17/066* (2013.01)

(58) Field of Classification Search
CPC . A63C 2203/14; A63C 17/017; A63C 17/015; B60L 11/1868; B60L 11/1877; H01M 2/1083
USPC ......................................................... 180/180
See application file for complete search history.

(56) References Cited

U.S. PATENT DOCUMENTS

| | | |
|---|---|---|
| D670,696 S | 11/2012 | Cobbett et al. |
| D685,419 S | 7/2013 | Ahmad et al. |
| D688,245 S | 8/2013 | Guerra |
| D688,664 S | 8/2013 | Guerra |
| 9,266,445 B2 | 2/2016 | Dastoor et al. |
| 9,302,173 B2 * | 4/2016 | DiCarlo .................. B62M 6/45 |
| 9,399,406 B2 | 7/2016 | Dastoor et al. |
| 2005/0006158 A1* | 1/2005 | Tsai ....................... A63C 17/12 180/167 |
| 2010/0222941 A1* | 9/2010 | Chang .................. A63C 17/015 701/2 |
| 2013/0081891 A1 | 4/2013 | Ulmen et al. |
| 2014/0277888 A1 | 9/2014 | Dastoor et al. |
| 2016/0121756 A1 | 5/2016 | Dastoor et al. |
| 2016/0303997 A1 | 10/2016 | Dastoor et al. |
| 2017/0252638 A1 | 9/2017 | Ulmen et al. |
| 2017/0259697 A1 | 9/2017 | Dastoor et al. |

* cited by examiner

Start

The electrically powered personal transport vehicle may be assembled with one or more batteries to power a motor configured to drive the wheels by way of a drive system. At least one battery of the one or more batteries may be disposed under a battery enclosure having a first light indicator system configured for communicative lighting for communicating with the operator.
802

The electrically powered personal transport vehicle may be assembled with a deck lighting system built into the personal transport vehicle. The deck lighting system includes a light strip of i) a single color of light-emitting diodes ("LEDs") such as white LEDs, ii) multiple different colors of LEDs such as red-green-blue ("RGB") light-emitting diodes, or iii) a combination of both, disposed in one or more grooves in a perimeter of the deck. The light strip may be a continuous string of LEDs or multiple strings of LEDs.
804

One or more LEDs of the light strip may communicate as follows: i) change state of one or more of the LEDs to communicate with the operator to give the operator navigational directions, ii) change state of one or more of the LEDs to communicate with the operator to provide the operator guidance on upcoming hazards, iii) turn on one or more of the LEDs to externally communicate a physical presence of the personal transport vehicle and its intended navigational route to other vehicles on a road or people on a sidewalk, and iv) any combination of these three.
806

A light control module cooperating with the light strip of the white LEDs, RGB LEDs, or combination of both LEDs, may be configured for lighting effects including i) lighting the perimeter of the deck with a constant intensity, ii) lighting the perimeter of the deck by fading into the constant intensity, iii) lighting the perimeter of the deck with one or more flashes from a first intensity to a second or third intensity, iv) lighting the perimeter of the deck in a breath from the first intensity through the second intensity and back to the first intensity, v) sweeping light around the perimeter of the deck in a clockwise or counterclockwise direction, vi) sweeping light from a front of the deck to a back of the deck simultaneously along both sides of the deck, vii) sweeping light from the back of the deck to the front of the deck simultaneously along both sides of the deck, or viii) a combination thereof.
808

The lighting effects of the light strip of the white LEDs, RGB LEDs, or a combination of both LEDs may correspond to operations to i) indicate a powering on the personal transport vehicle, ii) indicate a powering off the personal transport vehicle, iii) cooperate with an ambient light sensor to turn on the deck lighting system and turn off the deck lighting system, iv) cooperate with a motor circuit to indicate a braking of the personal transport vehicle, v) cooperate with a battery circuit to indicate a beginning to charge the one or more batteries of the personal transport vehicle, vi) cooperate with the battery circuit to indicate ongoing charging of the batteries of the personal transport vehicle, vii) cooperate with the battery circuit to indicate a fully charged battery of the personal transport vehicle, viii) cooperate with a wireless communication circuit of the personal transport vehicle to indicate a pairing of the personal transport vehicle to an external device for wireless communication between the personal transport vehicle and the external device, ix) to indicate a mode of operation of the personal transport vehicle, or x) a combination thereof.
810

A light control module cooperating with the light strip may be configured to cause the RGB LEDs to be activated automatically by an impulse from a motor driver unit when signaling breaking lights.
812

A light control module cooperating with the light strip may be configured to cause the LEDs to be activated automatically i) by sensing a shift in weight of the operator on the deck, ii) by receiving a command from the remote control and iii) any combination of both, to indicate a direction the operator intends to turn the personal transport vehicle.
814

A light control module cooperating with an ambient light sensor may be configured to receive a signal sent by the ambient light sensor to either increase or decrease an amount of lumens the LEDs need to emit depending on whether the ambient light sensor detects whether it may be currently daytime, nighttime, or dusk.
816

The light strip may be electrically connected to be powered through one or more access ports in a motor driver unit for the motor. Alternatively, the light strip may be electrically connected to be powered directly from a main power bus connected to the one or more batteries.
818

A companion remote control for the personal transport vehicle may be configured to allow the operator to activate the LEDs and has a second light indicator system that may be also configured for communicating with the operator.    820

Both the first light indicator system of the battery enclosure and the second light indicator system of the companion remote control includes a primary RGB LED and a secondary linear LED array. The primary RGB LED of the first light indicator system and the primary RGB LED of the second light indicator system are configured to communicate with the operator in concert by way of the communicative lighting for communicating with the operator. The secondary linear LED array of the first light indicator system and the secondary linear LED array of the second light indicator system are also configured to communicate with the operator in concert by way of the communicative lighting.    822

A companion mobile phone application for the personal transport vehicle resident in a mobile computing device may be configured to wirelessly communicate, via a wireless communication circuit of the mobile computing device with i) a wireless communication circuit of the personal transport vehicle, ii) a wireless communication circuit of the companion remote control, or iii) any combination of both the wireless communication circuit of the personal transport vehicle and the wireless communication circuit of the companion remote control. The lighting effects of the light strip of the white LEDs or RGB LEDs correspond to pairing the personal transport vehicle to an external device for wireless communication between the personal transport vehicle and the external device. Such lighting effects include lighting the perimeter of the deck in a sequence of flashes until the personal transport vehicle is paired to the external device.    824

The companion mobile phone application may be configured to turn the deck lighting system on or off and allow the operator to select one or more operational modes for the personal transport vehicle including i) a utility mode to make settings changes to personal transport vehicle, ii) a ride mode to set acceleration and deceleration thresholds for the personal transport vehicle, and iii) a mood mode that includes a number of light based indicators to indicate any of 1) the operator's mood and 2) customize an appearance of the personal transport vehicle when those light based indicators are activated.    826

Fig. 8C          ( End )

ELECTRICALLY POWERED TRANSPORT VEHICLE WITH A LIGHTING SYSTEM

CROSS REFERENCE

This application claims the benefit under 35 USC 119 of U.S. Provisional Patent Application No. 62/563,551, filed Sep. 26, 2017, titled "An electric personal transport vehicle with various improvements," which is hereby incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to an electric personal transport vehicle, such as an electric-powered skateboard, having various improvements including a lighting system.

BACKGROUND

Personal transport vehicles are a popular means of transport. Because smaller-sized personal transport vehicles such as unpowered skateboards and bicycles lack the speed and range of gasoline powered motorized vehicles, electrically powered versions of such smaller-sized personal transport vehicles are being developed. However, due to their diminutive size and increased speed and range, such electrically powered personal transport vehicles can be difficult for other fellow motorists to see on the roads and/or people on the sidewalk to see. As such, there is a need for electrically powered personal transport vehicles with increased visibility on the roads and sidewalks. Provided herein are vehicles, systems including the vehicles, and methods thereof that can meet or exceed at least the foregoing need.

SUMMARY

Provided herein is an electrically powered personal transport vehicle including, in an embodiment, a deck, one or more trucks, one or more wheels, one or more batteries, and a deck lighting system. The deck is configured to support the weight of an operator standing on the deck while operating the personal transport vehicle. The one or more trucks are mounted to the deck, a truck may include an axle upon which at least one wheel of the one or more wheels is mounted. The one or more batteries power one or more motors configured to drive the wheels. The deck lighting system is built into the personal transport vehicle and configured to cooperate with i) a companion remote control to provide audible signals or haptic vibrations, ii) one or more output devices to provide audible signals or haptic vibrations attached to or built into the personal transport vehicle, such as a speaker, iii) a helmet configured to provide audible signals or haptic vibrations, iv) or a combination thereof. One or more lights of the deck lighting system are configured to change state to communicate with the operator giving the operator navigational directions, providing the operator guidance on upcoming hazards, or externally communicating a physical presence of the personal transport vehicle and its intended navigational route to other drivers on the road or people on a sidewalk.

Also provided herein is, in an embodiment, an electrically powered personal transport vehicle, a companion remote control for the personal transport vehicle, and a companion mobile phone application for the personal transport vehicle. The personal transport vehicle includes a deck, one or more trucks, one or more wheels, one or more batteries, and a deck lighting system. The deck is configured to support a weight of an operator standing on the deck while operating the personal transport vehicle. The one or more trucks are mounted to a bottom of the deck. A truck may include an axle upon which at least one wheel of the one or more wheels is mounted. The one or more batteries power a motor configured to drive the wheels by way of a drive system, such as a pulley system. At least one battery of the one or more batteries is disposed under a battery enclosure having a first light indicator system configured for communicative lighting for communicating with the operator. The deck lighting system is built into the personal transport vehicle. The deck lighting system includes a light strip of i) white light-emitting diodes ("LEDs"), ii) red-green-blue ("RGB") light-emitting diodes, or iii) a combination of both, disposed in one or more grooves in a perimeter of the deck. The light strip may be composed of one or more individual strings of LEDs. The one or more LEDs of the light strip are configured to change to communicate with the operator giving the operator navigational directions, providing the operator guidance on upcoming hazards, or externally communicating a physical presence of the personal transport vehicle and its intended navigational route to other vehicles on the road or people on a sidewalk.

These and other features of the design provided herein can be better understood with reference to the drawings, description, and claims, all of which form the disclosure of this patent application.

DRAWINGS

The drawings refer to an embodiment of the design provided herein in

FIGS. 8A-8C illustrate an example embodiment of flow diagram for the personal transport vehicle.

Figure 1:
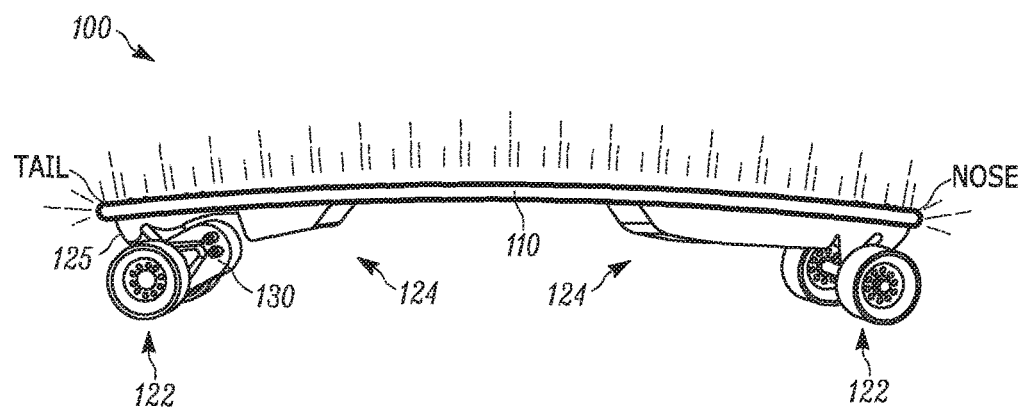
FIG. 1 illustrates an example embodiment of an electric-powered skateboard that includes a deck, one or more wheels, and one or more electric motors mounted to a drive truck of one or more trucks.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of wheels in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first electric-powered skateboard, can be made. However, the specific numeric reference should not be interpreted as a literal sequential order but rather interpreted that the first electric-powered skateboard is different than a second electric-powered skateboard. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, a personal transport system is provided including, in an embodiment, an electrically powered personal transport vehicle, a companion remote control, and a companion mobile phone application. The personal transport vehicle can be a skateboard that has an operator-supporting deck, one or more trucks mounted to the deck, one or more wheels mounted on an axle of the one or more trucks, one or more batteries, and a deck lighting system. The one or more batteries power one or more motors configured to drive the wheels by way of a drive system. At least one battery is disposed under a battery enclosure having a first light indicator system configured for communicating with the operator. The companion remote control has a second light indicator system also configured for communicating with the operator. The deck lighting system includes a light strip of i) white light-emitting diodes ("LEDs"), ii) red-blue-green ("RGB") light-emitting diodes, or iii) a combination of both, disposed in one or more grooves in a perimeter of the deck. The LEDs are configured to change state to communicate with the operator or others on the road or on the sidewalk.

Electric Personal Transport Vehicle

The design is directed to an electric personal transport vehicle, a mobile application, an on-line application, a backend support system for use with the electric personal transport vehicle, or a combination thereof.

The electric personal transport vehicle, such as an electric-powered skateboard, has many features and some example features will be discussed below. In general, an embodiment discussing an electric-powered skateboard will be discussed as an example embodiment.

FIG. 1A illustrates example embodiment of an electric-powered skateboard 100 that includes a deck 110, one or more wheels 122, and one or more electric motors 130 mounted to a drive truck 125 of one or more trucks 125.

A drive truck 125 supports one or more wheels. The electric motor(s) is configured to drive the wheels. The drive truck 125 is mounted to the deck 110 at either a front (or nose) of the deck 110 or a back (or tail) or the deck 110. In cases where one wheel was used the truck 125 could be mounted in the middle of the deck 110. The drive trucks 125 are mounted to the deck at the front and back of the deck in FIG. 1. One or more batteries within one or more enclosures (e.g., battery enclosure 500 of FIGS. 4 and 5B) eventually mount to the deck behind the front truck or in front of the rear truck. The battery is mounted to the deck within a battery enclosure 500 (see FIG. 5B) behind the front truck in FIG. 1. The batteries may mount to a bottom surface of the deck or within a compartment within the deck. The deck itself may be the battery enclosure, with no need for a secondary battery enclosure. The one or more batteries supply power to the electric motor or motors, lights the deck lighting system, and other electronic equipment including various sensors. One or more processors and various software routines are configured to control the operation of the electric motor(s), lights of the deck lighting system, sensor(s), etc.

Figure 2:
FIG. 2 illustrates an example embodiment of an electric-powered skateboard that includes a deck, and a weight of a rider being supported by the deck, truck, the one or more trucks, and the one or more wheels.

FIG. 2 illustrates an example embodiment of the electric-powered skateboard 100 that includes the deck 110, and a weight of a rider R being supported by the deck 110, the one or more trucks 124, and the one or more wheels 122.

The rider may change the angles of the deck by shifting his or her weight on the deck via commands given through the companion remote control, or a combination thereof. Changing the balance of the rider's weight may be used as a control input for steering, acceleration, braking, or a combination thereof.

Companion Remote Control

Figure 3:
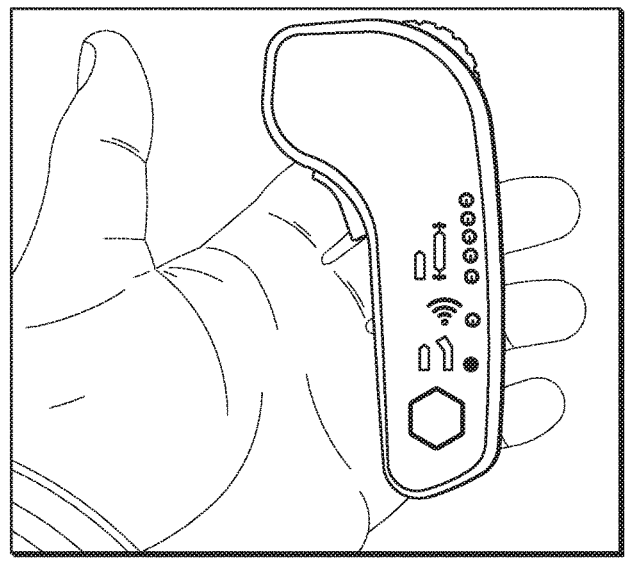
FIG. 3 illustrates an example embodiment of a companion remote control for controlling an electric-powered skateboard.

FIG. 3 illustrates an example embodiment of a companion remote control 300 for controlling the electric-powered skateboard 100.

The companion remote control may be a stand-alone hand-held device as shown in FIG. 3, a suitably programmed mobile computing device typically running a software application (see FIG. 7) resident on that mobile computing device, or a combination thereof. In an example embodiment, the mobile computing device may be a smart phone, a smart watch, a tablet computer, etc. The mobile computing device may include a wireless transmitter, such as a radio antenna, for wirelessly communicating with the skateboard. The companion remote control may be a wireless companion remote control and use one or more antennae or transmission frequencies to provide signals to the electric-powered skateboard. Communication may be one way, two way, or networked among multiple devices communicating together with each other or the electric-powered skateboard.

The companion remote control puts the power over the board's operation in of the palm of the rider's hand. The companion remote control is configured to control the acceleration and deceleration of the electric-powered skateboard from a fast or slow acceleration to quick or gentle braking. The high performance, optionally Bluetooth-enabled companion remote control acts as a safe, secure link between the rider and the board. The companion remote control may or may not use the Bluetooth protocol for transmission. Any variety of wireless transmission protocols may be acceptable for transmission of signals to and from the electric-powered skateboard.

The companion remote control is configured to provide a variable control of the board from a beginning rider to a pro rider. Multiple ride modes, such as four different pre-programmed modes, make it easier than ever to jump on a board regardless of skill level. The companion remote control is initially configured to start in the beginner ride mode. In the beginner's ride mode, the personal transport vehicle goes up to, for example, 11 mph, and can allow a rider to work his or her way up to professional ride mode, which tops out at, for example, 22 mph. However, the rider may manually set the mode as well as the on-board processing system may track the rider's habits and dynamically adapt the initial mode the board boots-up into. Both manually and in artificial intelligence-enhanced mode, the system can switch between different ride modes based on riding terrain and rider skill level to maximize range and take full advantage of the board's capabilities. An artificial intelligence program can be configured to record different parameters to figure out a skill level and habits of the rider and provide customized feedback to the rider of the board for riding on the board. For example, the artificial intelligence program can be configured to change settings on the board for acceleration and deceleration.

Deck Structural Material and Design

Figure 4:
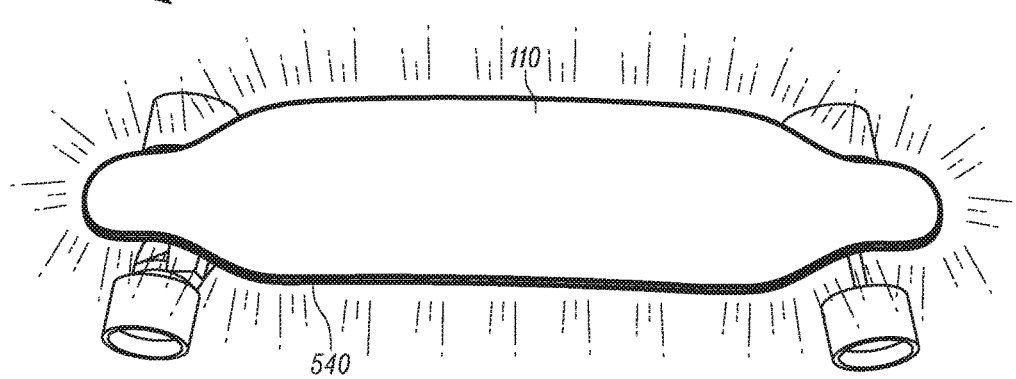
FIG. 4 illustrates an example embodiment of an electric-powered skateboard that has lighting system embedded in the deck system.

FIG. 4 illustrates an example embodiment of the electric-powered skateboard 100 that has a flexible deck 110 and a deck lighting system 540.

Figure 5A:
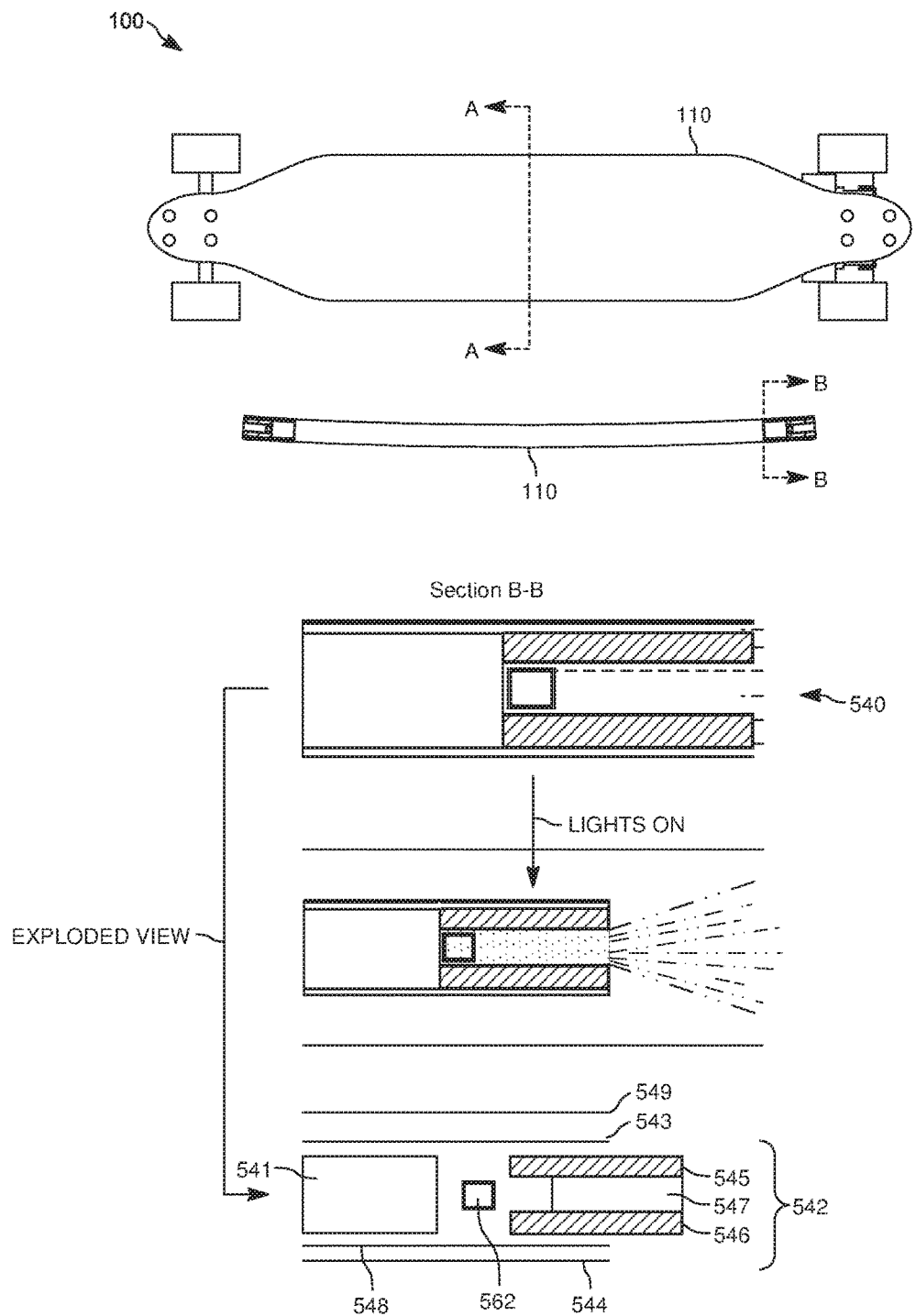
FIG. 5A illustrates an example embodiment of an electric-powered skateboard that has a deck lighting system the deck.
Figure 5B:
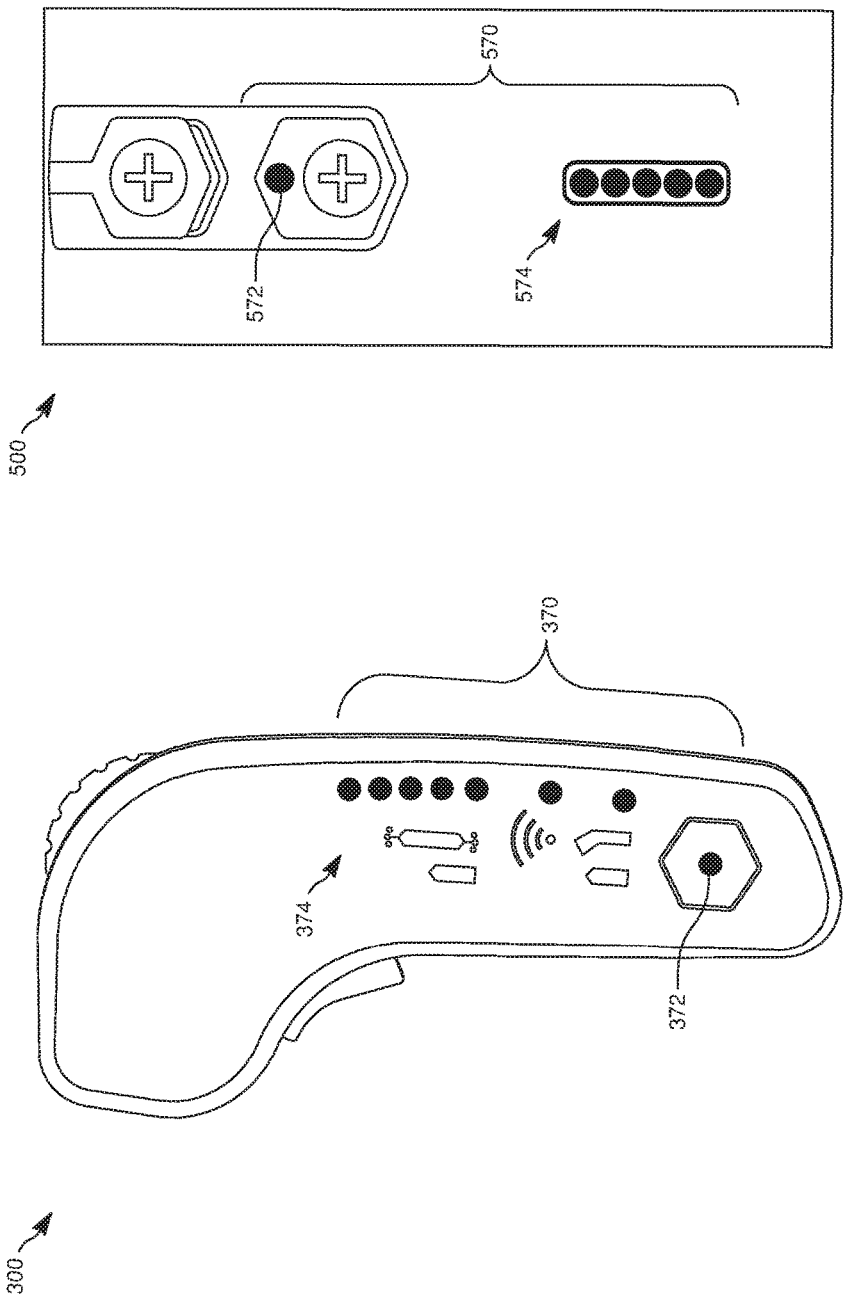
FIG. 5B illustrate an example embodiment of an electric-powered skateboard that has a light indicator system.

The engineered flexible deck further allows for a deck lighting system 540 to be incorporated into the deck 110, which deck lighting system 540 is shown and described in detail with respect to FIG. 5A herein. With respect to at least construction of the flexible deck 110 however, the deck lighting system 540 can be molded into the deck 110 as shown in FIG. 5A. For example, the deck 110 can be formed a deck core 541 optionally molded around the flexible wooden spine, a sidewall 542 around a perimeter of the deck core 541, a top laminate 543 over both the deck core 541 and the sidewall 542, and a bottom laminate 544 under both the deck core 541 and the sidewall 542. The sidewall 542 can be formed of a top sidewall layer 545, a bottom sidewall layer 546, and a middle sidewall layer 547 between the top sidewall layer 545 and the bottom sidewall layer 546. A groove in the perimeter of the deck is formed between the deck core 541 and the middle sidewall layer 547 as well as between the top sidewall layer and the bottom sidewall layer. The groove in the perimeter of the deck is designed for housing the light strip 562 of the deck lighting system 540. A light blocking film 548 is disposed between the light strip 562 of the deck lighting system 540 and the bottom laminate 544 configured to block light emission from a bottom surface of the deck 110. Grip tape 549 over a top surface of the deck is configured to block light emission from the top surface of the deck. The grip tape 549 over the light strip may also be configured to assist in securing the light strip to the deck.

Note, the user can customize the aesthetics such as the color of his or her board with the plastic bumper and decals on the deck. Also, some other weight-saving mechanisms or techniques have been developed for the board while still keeping the board flexible.

Note, the deck may have one or more hollow cavities to house electrical components such as a printed circuit board placed in the deck or molded into the deck for wiring different electrical components together or housing various sensors integrated into the skateboard. For example, a first hollow cavity may be designed into the board in an area under the battery, motor driver, or one of the one or more trucks with entrance holes aligned from the top or bottom so that the electrical cable between the battery and the motor can be installed and removed with its electrical connectors and fittings still integrated with the cable.

Deck Lighting System for the Electric-Dowered Skateboard

Figure 6:
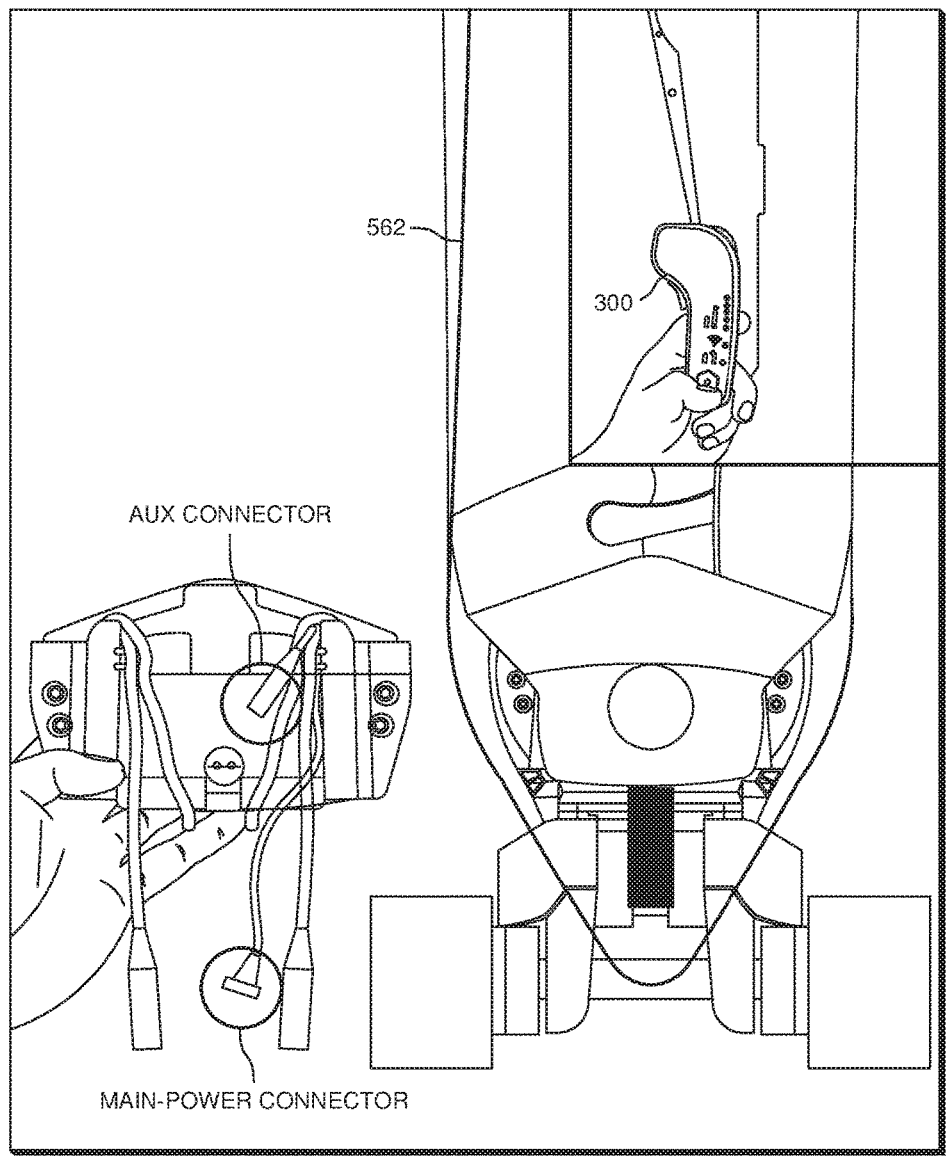
FIG. 6 illustrate an example embodiment of an electric-powered skateboard that has a deck lighting system the deck.

FIGS. 4, 5A and 6 illustrate an example embodiment of the electric-powered skateboard 100 that has a deck lighting system 540 in the deck.

A deck lighting system can be integrated into the skateboard deck for style, safety, and aesthetics. The deck lighting system is user controllable and can be part of an interactive user interface. Lights of the deck lighting system built onto the deck of the skateboard can both communicate the user's intentions to others as well communicate to the rider.

As discussed with respect to the construction of the engineered flexible deck, the deck lighting system can be integrated into the deck 110 by way of at least a light strip 562 of LEDs as shown in FIG. 5A, which light strip 562 includes, for example, a light strip of individually addressable white or RGB LEDs. Furthermore, one or more light strips such as the light strip 562 may contain the LEDs. The light strip 562 can either go around an entire perimeter of the deck 110 or in portions of the perimeter of the deck 110 such as around either one or both of the nose and tail, along each side of the deck 110 excluding either one or both of the nose and tail, or in regularly repeating portions around the entire perimeter of the deck 110. Again, the light strip 562 may be disposed in a three-part sidewall 542 of the deck 110: a sidewall top layer 545, a sidewall middle layer 547 configured as a light diffuser (e.g., clear thermoplastic polyurethane), and a sidewall bottom layer 546. In an embodiment, a special honey-comb lattice structure is used to aid in diffusion in addition to the transparent middle sidewall. To use the honeycomb, the system may encapsulate the LED strip and Honeycomb diffuser in a tube of clear heat-shrink tubing to prevent lamination epoxy from infiltrating into the pores. The deck 110 may also have some grip tape 549 and a deck top laminate 543 such as fiberglass, at least the grip tape 549 being configured to block any light emission from the light strip 562 through a top surface of the deck 110. The light strip 562 may be integrated into a groove of the deck 110 by way of, for example, a tongue-and-groove mechanism or some other securing mechanism such as an interference fit. This three-part plastic sidewall 542 is pre-fabricated. The light strip 562 is positioned in the groove between the sidewall 542 of the deck 110 and the deck core 541. All of the components can then be laminated together into a solid enclosed deck 110, and the grip tape 549 may be added to the finished deck 110.

The deck lighting system may have its own power source, or the deck lighting system may be wired and powered by way of the main power line or a power line from one of a number of accessory ports in the motor driver unit. In an embodiment, for example, a power line connects the deck lighting system to the accessory port in the motor driver unit as shown in FIG. 6. Alternatively, the deck lighting system may be powered directly from the battery's main power and communication bus. Alternatively, the deck lighting system may have their own power source. Furthermore, the light strip may have an additional control unit or electrical resistance circuit to step down an amount of the electrical voltage being supplied to the light strip or to control an operational behavior of the deck lighting system.

Figure 7:
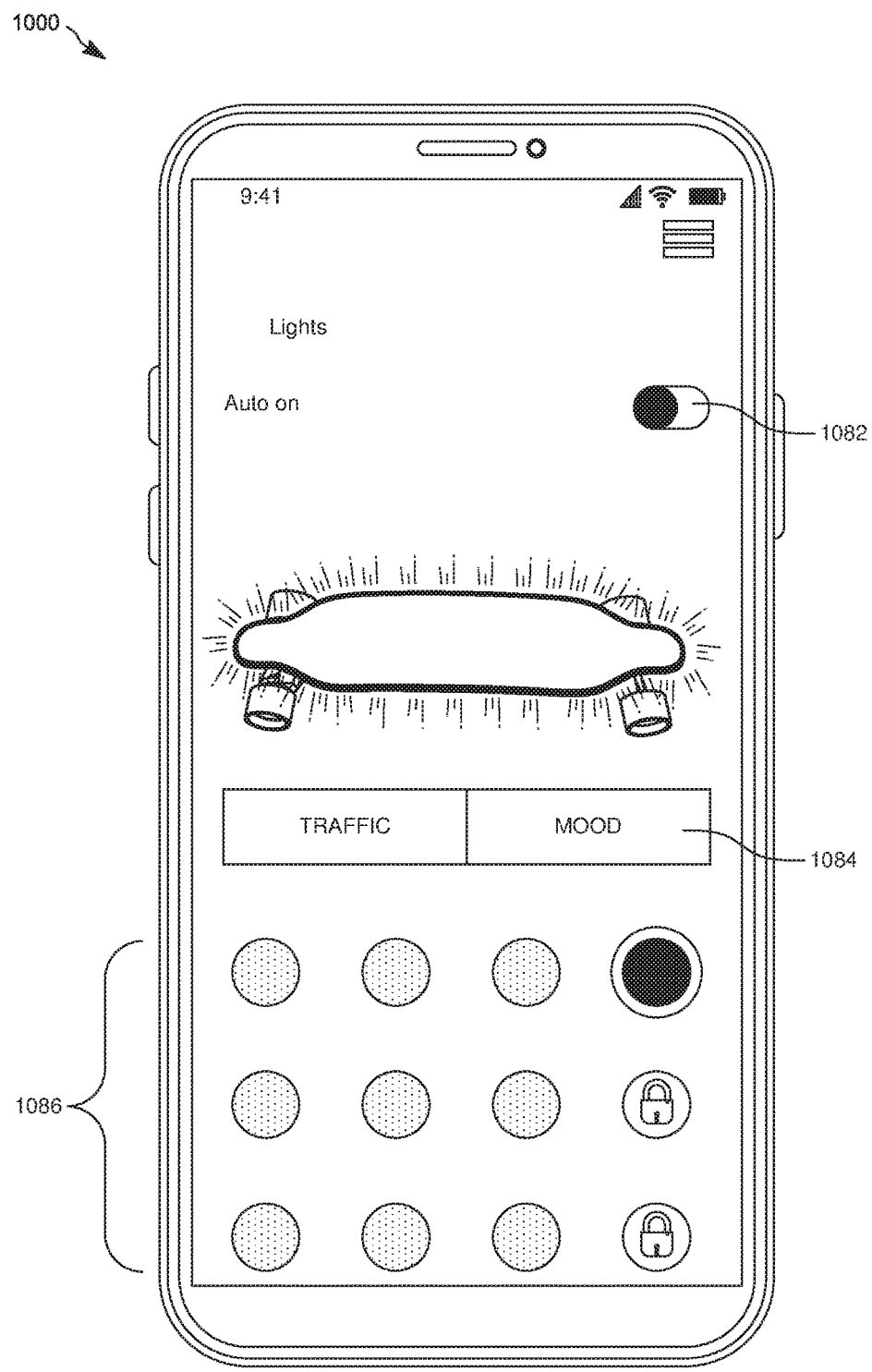
FIG. 7 illustrates an example embodiment of a companion application for communicating with an electric-powered skateboard.

A user may activate the deck lighting system on the deck using the companion remote control 300 (FIG. 3) or the companion mobile phone application 1000 (FIG. 7). In addition, the deck lighting system can also be activated automatically by i) an impulse from the motor driver when signaling braking lights, or ii) sensing a shift in weight/command from the companion remote control to turn left or right by the rider. In addition, the lights of the deck lighting system as well as lights of the light indicator system in the companion remote control can also be activated by the on-board navigation system to indicate which way to turn to the user, etc. Also, a signal can be sent by an ambient light sensor disposed in the board to either increase or decrease an amount of lumens the deck lighting system needs to emit depending on whether the ambient light sensor detects whether it is currently daytime, nighttime, or dusk. The lights of the deck lighting system may be controlled automatically by the skateboard's electrical system sensing changes in motion either through changes in motor or wheel speed, acceleration through an onboard accelerometer, or other sensor inputs.

Again, the deck lighting system 540 built into the skateboard includes the light strip 562 of a single solid color LED, such as white, amber, etc. OR a multiple color composition, such as Red-Green-Blue LEDs, embedded in a perimeter of the deck 110. The light strip of the white LEDs is configured for white lighting effects, and the light strip of the RGB LEDs is configured for colored lighting effects. The light strip of the RGB LEDs is further configured to vary in color about one or more portions of the perimeter of the deck in combination with the lighting effects. Such lighting effects include lighting the perimeter of the deck with a constant intensity, lighting the perimeter of the deck by fading into the constant intensity, lighting the perimeter of the deck with one or more flashes from a first intensity to a second intensity, lighting the perimeter of the deck in a so-called breath from the first intensity through the second intensity and back to the first intensity, sweeping light around the perimeter of the deck in a clockwise or counterclockwise direction, sweeping light from a front of the deck to a back of the deck simultaneously along both sides of the deck, sweeping light from the back of the deck to the front of the deck simultaneously along both sides of the deck, or a combination thereof. The second intensity in the foregoing lighting effects (e.g., the second intensity of the flashing, breathing, etc.) can be greater than the first intensity in the foregoing lighting effects (e.g., the first intensity of the flashing, breathing, etc.). Alternatively, the first intensity can be greater than the second intensity. In addition, either the first intensity or the second intensity can be zero intensity with intensity being, for example, luminance measured in candela per unit of surface area.

The lighting effects of the light strip 562 of the white or RGB LEDs correspond to powering on the skateboard; powering off the skateboard; turning on the deck lighting system; turning off the deck lighting system; braking the skateboard, optionally with the companion remote control; beginning to charge the skateboard; ongoing charging of the skateboard; a charged skateboard; pairing the skateboard to an external device for wireless communication between the skateboard and the external device; indicating a mode such as ride mode, learning mode, utility mode (e.g., power up, power down, charging, etc.), traffic mode, mood mode, or reward mode (e.g., unlockable moods and the like for 100-mile milestones, 500-mile milestones, etc.) of the skateboard; or a combination thereof.

In an example, the lighting effects of the light strip of the white or RGB LEDs can correspond to powering on the skateboard. Such lighting effects for the light strip of the white LEDs include lighting the perimeter of the deck in a first breath from a first intensity through a second intensity and back to the first intensity or a higher or lower intensity thereof when powering on the skateboard. Such lighting effects for the light strip of the RGB LEDs include lighting the perimeter of the deck by sweeping one or more colors of light (e.g., orange light) from the back of the deck to the front of the deck simultaneously along both sides of the deck when powering on the skateboard. The lighting effects of the light strip of the white or RGB LEDs also correspond to powering off the skateboard. Such lighting effects for the light strip of the white LEDs include lighting the perimeter of the deck in a second breath from the first intensity through the second intensity and back to the first intensity or a higher or lower intensity thereof when powering off the skateboard. Such lighting effects for the light strip of the RGB LEDs include lighting the perimeter of the deck by sweeping one or more colors of light (e.g., orange) from the front of the deck to the back of the deck simultaneously along both sides of the deck when powering off the skateboard.

In another example, the lighting effects of the light strip of the white or RGB LEDs can correspond to turning on the deck lighting system. Such lighting effects for the light strip of the white LEDs include lighting the perimeter of the deck by fading into a constant intensity when the deck lighting system is turned on. Such lighting effects for the light strip of RGB LEDS include lighting the perimeter of the deck by fading into one or more colors of light (e.g., red light at tail, white light at nose for traffic mode; red light at tail, any color light at nose in mood mode) of a constant intensity respectively about one or more portions of the deck when the deck lighting system is turned on. The lighting effects of the light strip of the white or RGB LEDs also correspond to turning off the deck lighting system. Such lighting effects for the light strip of the white LEDs include fading out from the constant intensity when the deck lighting system is turned off. Such lighting effects for the light strip of the RGB LEDs include fading out from the one or more colors of light of the constant intensity respectively about the one or more portions of the deck when the deck lighting system is turned off.

In another example, the lighting effects of the light strip of the white or RGB LEDs can correspond to charging the skateboard from beginning a charge of a skateboard, ongoing charging of the skateboard, and finishing the charge of the skateboard.

With respect to the lighting effects of the light strip of a single color, for example, the white LEDs for charging the skateboard, such lighting effects include lighting the perimeter of the deck in a first breath from a first intensity through a second intensity and back to the first intensity or a higher or lower intensity thereof when beginning to charge the skateboard. Regarding ongoing charging of the skateboard, such lighting effects include lighting the perimeter of the deck at about the first intensity for a duration of the ongoing charging of the skateboard. Regarding finishing the charge of the skateboard, such lighting effects include lighting the perimeter of the deck in a second breath from the first intensity through the second intensity and back to the first intensity or a higher or lower intensity thereof when the skateboard is completely charged.

With respect to the lighting effects of the light strip of the RGB LEDs for charging the skateboard, such lighting effects include lighting the deck in one or more colors of light (e.g., orange) respectively about one or more portions of the perimeter of the deck in a first breath from a first intensity through a second intensity and back to the first intensity or a higher or lower intensity thereof when beginning to charge the skateboard. Regarding ongoing charging of the skateboard, such lighting effects include lighting the deck in the one or more colors of light (e.g., orange) respectively about the one or more portions of the perimeter of the deck at about the first intensity for a duration of the ongoing charging of the skateboard. Regarding finishing the charge of the skateboard, such lighting effects include lighting the deck in the one or more colors of light (e.g., green) respectively about the one or more portions of the perimeter of the deck in a second breath from the first intensity through the second intensity and back to the first intensity or a higher of lower intensity thereof when the skateboard is charged.

In another example, the lighting effects of the light strip of the white or RGB LEDs can correspond to pairing the skateboard to an external device for wireless communication between the skateboard and the external device. Such lighting effects for the light strip of the white LEDs include lighting the perimeter of the deck in a sequence of flashes until the skateboard is paired to the external device. Such lighting effects for the light strip of the RGB LEDs include lighting the deck in one or more colors of light (e.g., blue) respectively about one or more portions of the perimeter of the deck in a sequence of flashes until the skateboard is paired to the external device.

In another example, the lighting effects of the light strip of the white or RGB LEDs can correspond to a selection of a mode of the skateboard. Such lighting effects for the light strip of the white LEDs include lighting the perimeter of the deck in a predetermined sequence of flashes for the selection of the mode. Such lighting effects for the light strip of the RGB LEDs include lighting the deck in one or more colors of light (e.g., orange, a user-selected color or mode, etc.) respectively about one or more portions of the perimeter of the deck in a predetermined sequence of flashes for the selection of the mode. Again, such modes include, but are not limited to ride mode, learning mode, utility mode (e.g., power up, power down, charging, making settings changes to personal transport vehicle etc.), traffic mode, mood mode, or reward mode (e.g., unlockable moods and the like for 100-mile milestones, 500-mile milestones, etc.).

In another example, the lighting effects of the light strip of at least the RGB LEDs can correspond to braking the skateboard. Such lighting effects for the light strip of the RGB LEDs include lighting a back portion of the perimeter of the deck red (e.g., red light at tail) while a front portion of the perimeter of the deck remains one or more other colors of light (e.g., white light at nose or any mood-mode color of light at nose) of an equal or lesser intensity (e.g., dimmed) than the back portion of the perimeter of the deck if the one or more other colors of light are already lighting the front portion of the perimeter of the deck prior to braking.

Following on the foregoing, the lights of the deck lighting system can be communicatively coupled to and configured to cooperate with the companion remote control or a helmet to indicate which way the user intends to turn (e.g., left or right), as well as provide audible signals or haptic vibrations to the user. The deck lighting system can indicate when the user is braking or putting the skateboard in motor into reverse. The deck lighting system provides safety at night by operating in a low-light mode just to illuminate the presence of the board and its rider. The deck lighting system can also illuminate the path the rider is following so the rider can see where they are going in the dark. The deck lighting system can be used for navigation purposes to indicate to the rider which way the rider is supposed to be turning when GPS and the navigation application are taking the rider to an address. The deck lighting system can communicate a caution or other information to the user when a particularly bumpy or rough patch of sidewalk or road is coming up. The caution or other information can be provided in cooperation with one or more other output devices to provide audible signals or haptic vibrations attached to or built into the personal transport vehicle, such as a speaker. The lights of the deck lighting system can change color or state and lighting pattern to convey different types of information. The user can customize the aesthetics such as color and lighting of his or her board in a mood mode of the skateboard. The customization can occur through physical application of different filters, setting changes for lights of the deck lighting system with multiple brightness or color settings through the companion remote control, or through a companion application on a smart device connected wirelessly or physically to the board. The mobile app is coded to allow users to customize by pre-selecting one of many different color design patterns for the board and/or and create their own color design pattern. The mobile app is coded to have several pre-set options and then an option for the rider to create their own color design pattern. The mobile app is also coded to have some screens around colors and dynamics and animation. Each user can create one of their own and then share their created scheme with others users as a downloadable scheme. The mobile app is coded to allow user's generate content and have that generated content published on the web and downloadable by other users.

Companion Application

FIG. 7 illustrates an example embodiment of a companion application 1000 for communicating with the electric-powered skateboard 100.

The companion application can be a mobile phone application as shown, or the companion application can be resident on a smart watch, a tablet computer, or the like. Regardless, the companion application is configured to wirelessly communicate with the skateboard, the companion remote control, or both the skateboard and the companion remote control. With respect to communicating with the skateboard, the companion application can be configured with a graphical user interface having a first graphical user element such as lights toggle 1082 configured to turn the deck lighting system on or off. The companion application can be further configured with a second graphical user element such as mode toggle 1084. As shown, the mode toggle can be configured to toggle between at least traffic mode and mood mode; however, other modes are available to the operator and the companion application can be configured to toggle between the other modes as well. Such other modes include at least a utility mode and a ride mode. As shown in FIG. 10, the mood mode is selected providing a number of mood indicators 1086 for expressing the operator's mood, from which mood indicators 1086 the operator can select. Some of the mood indicators are solid colors indicating the light strip of the RGB LEDS will take on a solid color of light corresponding to the solid-colored mood indicator selected. At least one of the indicators represents a gradient from a first color (e.g., orange) to another color (e.g., white) indicating the light strip of the RGB LEDS will take on the gradient from the first color at, for example, the tail, to the second color at, for example, the nose, when selected. Other mood indicators are available to the operator as shown, but such mood indicators are locked until unlocked by way of reward mode, which reward mode provides unlockable mood indicators and the like for 100-mile milestones, 500-mile milestones, etc. of the skateboard. Advanced lighting effects such as blinking, sweeping, flashing, breathing, and the like can be made available by way of additional mood indicators gained from the reward mode or promotions.

Light Indicator Systems

In addition to the deck lighting system, the electric-powered skateboard 100 includes one or more light indicator systems configured for communicative lighting for communicating with the operator. While the deck lighting system also includes lighting effects with one or more colors for communicating with the operator (and others), the one or more light indicator systems generally focus on providing utility-related information to the operator. That said, the deck lighting system also provides utility-related information, and the deck lighting system and the one or more light indicator systems are configured to work in concert to provide at least some of the utility-related information to the operator of the skateboard. Such utility-related information includes, but is not limited to, powering the skateboard on or off, charging the skateboard, and pairing the skateboard to an external device for wireless communication between the skateboard and the external device.

The one or more light indicator systems include at least a first light indicator system onboard the skateboard, the first light indicator system disposed, for example, in the battery enclosure 500 under which at least one battery of the one or more batteries for the skateboard is disposed. As shown, in FIG. 5B, the first light indicator system of the battery enclosure 500, or the portion thereof shown, is referenced as the first light indicator system 570. The one or more light indicator systems can further include a second light indicator system external to the skateboard such as on the companion remote control 300 for the skateboard. As shown, in FIG. 5B, the second light indicator system of the companion remote control 300 is referenced as second light indicator system 370. The one or more light indicator systems can further include a third light indicator system external to the skateboard such as on a companion mobile phone application for the skateboard.

Each light indicator system of at least the first light indicator system 570 of the battery enclosure 500 and the second light indicator system 370 of the companion remote control 300 includes a primary RGB LED 374, 572 and a secondary linear LED array 374, 574. The primary RGB LED 572 of the first light indicator system 570 and the primary RGB LED 372 of the second light indicator system 370 are configured to communicate with the operator in concert by way of the communicative lighting. The secondary linear LED array 574 of the first light indicator system 570 and the secondary linear LED array 374 of the second light indicator system 370 are also configured to communicate with the operator in concert by way of the communicative lighting. Again, the deck lighting system also provides utility-related information by such communicative lighting, and the deck lighting system and the one or more light indicator systems are also configured to work in concert to provide at least some of the utility-related information to the operator of the skateboard by the communicative lighting.

In an example of the communicative lighting of at least the first and second light indicator systems, the communicative lighting of the primary RGB LEDs of the first and second light indicator systems can correspond to powering on the skateboard. Such communicative lighting includes lighting the primary RGB LEDs a common color of light (e.g., green) when powering on the skateboard. The communicative lighting of the secondary linear LED arrays of the first and second light indicator systems can also correspond to powering on the skateboard. Such communicative lighting includes lighting the secondary linear LED arrays in a sweep across each secondary linear LED array up to a number of LEDs corresponding to a battery level of the at least one battery when powering on the skateboard. The lighting effects of the light strip of the white or RGB LEDs of the deck lighting system can also simultaneously correspond to powering on the skateboard, which lighting effects are set forth herein.

In another example of the communicative lighting of at least the first and second light indicator systems, the communicative lighting of the primary RGB LEDs of the first and second light indicator systems can correspond to ongoing charging of the skateboard. Such communicative lighting includes lighting the primary RGB LEDs a common color of light (e.g., orange) when charging the skateboard. The communicative lighting of the secondary linear LED arrays of the first and second light indicator systems can also correspond to ongoing charging of the skateboard. Such communicative lighting includes lighting the secondary linear LED arrays up to a number of LEDs corresponding to a battery level of the at least one battery when charging the skateboard. The lighting effects of the light strip of the white or RGB LEDs of the deck lighting system can also simultaneously correspond to the ongoing charging of the skateboard, which lighting effects are set forth herein.

In another example of the communicative lighting of at least the first and second light indicator systems, the communicative lighting of the primary RGB LEDs of the first and second light indicator systems can correspond to a charged skateboard. Such communicative lighting includes lighting the primary RGB LEDs a common color of light (e.g., green) upon completing charging and arriving at the charged skateboard. The communicative lighting of the secondary linear LED arrays of the first and second light indicator systems can also correspond to the charged skateboard. Such communicative lighting includes lighting all LEDs of the secondary linear LED arrays indicating a full battery level of the at least one battery upon completing charging and arriving at the charged skateboard. The lighting effects of the light strip of the white or RGB LEDs of the deck lighting system can also simultaneously correspond to the charged skateboard, which lighting effects are set forth herein.

In another example of the communicative lighting of at least the first and second light indicator systems, the communicative lighting of the primary RGB LEDs of the first and second light indicator systems can correspond to pairing the skateboard to an external device for wireless communication between the skateboard and the external device. Such communicative lighting includes blinking the primary RGB LEDs in a common color of light (e.g., blue) when pairing the skateboard to the external device and holding the primary RGB LEDs in a same or different common color of light upon successfully pairing the skateboard to the external device. The lighting effects of the light strip of the white or RGB LEDs of the deck lighting system can also simultaneously correspond to pairing the skateboard to the external device, which lighting effects are set forth herein.

Motor Control

The electric-powered skateboard starting and stopping power supplied to the motor is optimized. The optimization extends to its battery to support the corresponding spikes of electrical current from the battery during an initial starting and any rapid braking. The improved dynamic range of batteries can be achieved via a battery controller and use of the regenerative braking. A first algorithm may be tuned specifically for, for example, a three pound main battery to move a 180-pound rider on the board with a smooth acceleration and deceleration. Large peaks in current and voltage may temporarily enter and exit cells in the battery, but control algorithms designed into the motor and battery control systems may make this a safe and acceptable action. Timing of power spikes, control of battery temperature, and selective routing of electrical energy to other components in the electric-powered skateboard all may be used to improve the overall acceleration and braking experience while allowing the battery to operate safely. A voltage or current mode control and control algorithm may be used to modulate electrical current spikes to get peak performance.

The controller may dynamically control power supplied to the electric motor(s) for the electric-powered skateboard. The controller may determine one or more user parameters via sensors, a user input value from a rider, and a combination of both. The controller may select a first electrical current output value based on the user input value and/or sensors from an input map. The controller may control power provisioned to the electric motor(s) to maintain an output current within a predetermined range of the first current output value. The controller may, by way of one or more sensors, detect a condition indicative of perturbation. The controller may then select a second electrical current output value for the first user input value based on the user parameter(s). The controller may in response to detecting the condition indicative of perturbation, controlling power provision to the electric motor to maintain the output current within a second predetermined range of the second current output value. The controller may then incrementally adjust an electrical current output value mapped to the first user input value from the second current output value to the first current output value. The controller will control power provisioning to the electric motor to maintain the output electrical current within a predetermined range of each adjusted current output value.

A set of electrical current sensors may be installed on the motor or in the motor control circuit. The controller may use the different sensors to determine electrical current in different scenarios to save power output from the battery and be more efficient or to enhance control of the motor. A scheme may be used where two current sensors are leveraged to sense all three phase currents in a three phase electrical motor using a ground referenced sensing scheme. This scheme may prevent sensor noise and reduce overall system cost.

An example embodiment of an electric-powered skateboard can use a belt drive system. Another embodiment can use a direct drive, in-hub, motor system. Another embodiment can use a geared motor system.

FIGS. 8A-8C illustrate flow diagrams of an embodiment for the personal transport vehicle. Note, the following steps may be performed in any order where logically possible.

In step 802, in an embodiment, the electrically powered personal transport vehicle may be assembled with one or more batteries to power a motor configured to drive the wheels by way of a drive system. At least one battery of the one or more batteries may be disposed under a battery enclosure having a first light indicator system configured for communicative lighting for communicating with the operator.

In step 804, the electrically powered personal transport vehicle may be assembled with a deck lighting system built into the personal transport vehicle. The deck lighting system includes a light strip of i) a single color of light-emitting diodes ("LEDs") such as white LEDs, ii) multiple different colors of LEDs such as red-green-blue ("RGB") light-emitting diodes, or iii) a combination of both, disposed in one or more grooves in a perimeter of the deck. The light strip may be a continuous string of LEDs or multiple strings of LEDs.

In step 806, one or more LEDs of the light strip may communicate as follows: i) change state of one or more of the LEDs to communicate with the operator to give the operator navigational directions, ii) change state of one or more of the LEDs to communicate with the operator to provide the operator guidance on upcoming hazards, iii) turn on one or more of the LEDs to externally communicate a physical presence of the personal transport vehicle and its intended navigational route to other vehicles on a road or people on a sidewalk, and iv) any combination of these three.

In step 808, a light control module cooperating with the light strip of the white LEDs, RGB LEDs, or combination of both LEDs, may be configured for lighting effects including i) lighting the perimeter of the deck with a constant intensity, ii) lighting the perimeter of the deck by fading into the constant intensity, iii) lighting the perimeter of the deck with one or more flashes from a first intensity to a second or third intensity, iv) lighting the perimeter of the deck in a breath from the first intensity through the second intensity and back to the first intensity, v) sweeping light around the perimeter of the deck in a clockwise or counterclockwise direction, vi) sweeping light from a front of the deck to a back of the deck simultaneously along both sides of the deck, vii) sweeping light from the back of the deck to the front of the deck simultaneously along both sides of the deck, or viii) a combination thereof.

In step 810, the lighting effects of the light strip of the white LEDs, RGB LEDs, or a combination of both LEDs may correspond to operations to i) indicate a powering on the personal transport vehicle, ii) indicate a powering off the personal transport vehicle, iii) cooperate with an ambient light sensor to turn on the deck lighting system and turn off the deck lighting system, iv) cooperate with a motor circuit to indicate a braking of the personal transport vehicle, v) cooperate with a battery circuit to indicate a beginning to charge the one or more batteries of the personal transport vehicle, vi) cooperate with the battery circuit to indicate ongoing charging of the batteries of the personal transport vehicle, vii) cooperate with the battery circuit to indicate a fully charged battery of the personal transport vehicle, viii) cooperate with a wireless communication circuit of the personal transport vehicle to indicate a pairing of the personal transport vehicle to an external device for wireless communication between the personal transport vehicle and the external device, ix) to indicate a mode of operation of the personal transport vehicle, or x) a combination thereof.

In step 812, the light control module cooperating with the light strip may be configured to cause the RGB LEDs to be activated automatically by an impulse from a motor driver unit when signaling breaking lights. For example, the lights are synchronized with the board in a couple of example ways. 1) If rider hits the brakes the red LEDs go from little bit of red to increasing their luminosity growing variably with how hard the user and/or system is hitting the brakes. The lights may react with the throttle and/or the motor driver unit. 2) The speed of the animation of the lights may be related to the current speed of the board. Lighting patterns, such as dots of light, go down in a sequence from the front to back of board; and, the lights or animations move faster as the board goes faster.

In step 814, the light control module cooperating with the light strip may be configured to cause the LEDs to be activated automatically i) by sensing a shift in weight of the operator on the deck, ii) by receiving a command from the remote control and iii) any combination of both, to indicate a direction the operator intends to turn the personal transport vehicle.

In step 816, the light control module cooperating with an ambient light sensor may be configured to receive a signal sent by the ambient light sensor to either increase or decrease an amount of lumens the LEDs need to emit depending on whether the ambient light sensor detects whether it may be currently daytime, nighttime, or dusk.

In step 818, the light strip may be electrically connected to be powered through one or more access ports in a motor driver unit for the motor. Alternatively, the light strip may be electrically connected to be powered directly from a main power bus connected to the one or more batteries.

In step 820, a companion remote control for the personal transport vehicle may be configured to allow the operator to activate the LEDs and has a second light indicator system that may be also configured for communicating with the operator.

In step 822, both the first light indicator system of the battery enclosure and the second light indicator system of the companion remote control includes a primary RGB LED and a secondary linear LED array. The primary RGB LED of the first light indicator system and the primary RGB LED of the second light indicator system are configured to communicate with the operator in concert by way of the communicative lighting. The secondary linear LED array of the first light indicator system and the secondary linear LED array of the second light indicator system are also configured to communicate with the operator in concert by way of the communicative lighting.

In step 824, a companion mobile phone application for the personal transport vehicle resident in a mobile computing device may be configured to wirelessly communicate, via a wireless communication circuit of the mobile computing device with i) a wireless communication circuit of the personal transport vehicle, ii) a wireless communication circuit of the companion remote control, or iii) any combination of both the wireless communication circuit of the personal transport vehicle and the wireless communication circuit of the companion remote control. The lighting effects of the light strip of the white LEDs or RGB LEDs correspond to pairing the personal transport vehicle to an external device for wireless communication between the personal transport vehicle and the external device. Such lighting effects include lighting the perimeter of the deck in a sequence of flashes until the personal transport vehicle is paired to the external device.

In step 826, the companion mobile phone application may be configured to turn the deck lighting system on or off and allow the operator to select one or more operational modes for the personal transport vehicle including i) a utility mode to make settings changes to personal transport vehicle, ii) a ride mode to set acceleration and deceleration thresholds for the personal transport vehicle, and iii) a mood mode that includes a number of light based indicators to indicate any of 1) the operator's mood and 2) customize an appearance of the personal transport vehicle when those light based indicators are activated.

Web Site

The web site is configured as a browser-based tool or direct cooperating application tool for configuring, analyzing, and communicating with the electric skateboard.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a fiber network, a cable network, and combinations thereof. In an embodiment, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device (e.g., smartphone with an Android-based operating system), a second mobile computing device (e.g., smartphone with an iOS-based operating system), a first wearable electronic device (e.g., a smartwatch), a first portable computer (e.g., laptop computer), a third mobile computing device or second portable computer (e.g., tablet with an Android- or iOS-based operating system), a first electric personal transport vehicle, a second electric personal transport vehicle, and the like. The client computing system can include, for example, the software application or the hardware-based system in which may be able exchange communications with the first electric personal transport vehicle, and/or the second electric personal transport vehicle. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer (e.g., the client computing system) and the server computing system can both initiate and respond to communications, their communications can be viewed as peer-to-peer. Additionally, the server computing systems include circuitry and software enabling communication with each other across the network.

Any one or more of the server computing systems can be a cloud provider. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

Computing Systems

A computing system can be, wholly or partially, part of one or more of the server or client computing devices in accordance with an embodiment. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). The drives and their associated computer storage media discussed herein, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application may be resident on the computing device and stored in the memory.

Another device that may be coupled to bus is a power supply such as a DC power supply (e.g., battery) or an AC adapter circuit. As discussed above, the DC power supply may be a battery, a fuel cell, or similar DC power source that needs to be recharged on a periodic basis. A wireless communication module can employ a Wireless Application Protocol to establish a wireless communication channel. The wireless communication module can implement a wireless networking standard.

In an embodiment, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An electrically powered personal transport vehicle, comprising:
   a deck configured to support a weight of an operator standing on the deck while operating the personal transport vehicle;
   one or more trucks mounted to a bottom of the deck, each of the trucks including an axle;
   one or more wheels mounted on each axle of the trucks;
   one or more batteries to power a motor configured to drive the wheels; and
   a deck lighting system built into the personal transport vehicle configured to cooperate with
   i) a companion remote control to provide audible signals or haptic vibrations,
   ii) one or more output devices to provide audible signals or haptic vibrations attached to or built into the personal transport vehicle,
   iii) a helmet configured to provide audible signals or haptic vibrations, or
   iv) a combination thereof,
   wherein one or more lights of the deck lighting system are configured to communicate as follows selected from a group consisting of
   i) change state of the one or more lights to communicate with the operator to give the operator navigational directions,
   ii) change state of the one or more lights to communicate with the operator to provide the operator guidance on upcoming hazards,
   iii) turn on the one or more lights to externally communicate a physical presence of the personal transport vehicle and the personal transport vehicle's intended navigational route to other vehicles on a road or people on a sidewalk, and
   iv) any combination of these three.

2. The personal transport vehicle of claim 1,
   wherein the deck lighting system built into the personal transport vehicle includes a light strip of a single color of LEDs embedded in a perimeter of the deck, where the light strip of single color of LEDs is part of the one or more lights, and
   wherein a light control module cooperating with the light strip of the single color of LEDs is configured to cause lighting effects as follows selected from a group consisting of i) lighting the perimeter of the deck with a constant intensity, ii) lighting the perimeter of the deck by fading into the constant intensity, iii) lighting the perimeter of the deck with one or more flashes from a first intensity to a second intensity, iv) lighting the perimeter of the deck in a breath from the first intensity through the second intensity and back to the first intensity, v) sweeping light around the perimeter of the deck in a clockwise or a counterclockwise direction, vi) sweeping light from a front of the deck to a back of the deck simultaneously along both sides of the deck, vii) sweeping light from the back of the deck to the front of the deck simultaneously along both sides of the deck, or viii) a combination thereof.

3. The personal transport vehicle of claim 2,
   wherein the light control module cooperates with the light strip in the deck lighting system to cause the lighting effects of the light strip of the single color of LEDs that correspond to operations on the personal transport vehicle selected from a group consisting of i) powering on the personal transport vehicle, ii) powering off the personal transport vehicle, iii) turning on the deck lighting system, iv) turning off the deck lighting system, v) beginning to charge the personal transport vehicle, vi) ongoing charging of the personal transport vehicle, vii) a fully charged personal transport vehicle, viii) pairing the personal transport vehicle to an external device for wireless communication between the personal transport vehicle and the external device, ix) indicating a mode of operation of the personal transport vehicle, or x) a combination thereof.

4. The personal transport vehicle of claim 2,
   wherein the lighting effects of the light strip of the single color of LEDs correspond to turning on the deck lighting system and include lighting the perimeter of the deck by fading into the constant intensity when the deck lighting system is turned on, and
   wherein the lighting effects of the light strip of the single color of LEDs correspond to turning off the deck lighting system and include fading out from the constant intensity when the deck lighting system is turned off.

5. The personal transport vehicle of claim 2,
   wherein the light control module cooperating with the light strip is configured to cause the lighting effects of the light strip of the single color of LEDs to correspond to powering on the personal transport vehicle and include lighting the perimeter of the deck in a first breath from the first intensity through the second intensity and back to the first intensity when powering on the personal transport vehicle, and
   wherein the lighting effects of the light strip of the single color of LEDs correspond to powering off the personal transport vehicle and include lighting the perimeter of the deck in a second breath from the first intensity through the second intensity and back to the first intensity when powering off the personal transport vehicle, where the single color of the LEDs is white.

6. The personal transport vehicle of claim 2,
wherein the light control module cooperating with a battery circuit for the one or more batteries is configured to cause the lighting effects of the light strip of the single color of LEDs correspond to charging the personal transport vehicle and include lighting the perimeter of the deck in a first breath from the first intensity through the second intensity and back to the first intensity when beginning to charge the personal transport vehicle,
wherein the lighting effects of the light strip of the single color of LEDs correspond to ongoing charging of the personal transport vehicle and include lighting the perimeter of the deck at the first intensity for a duration of the ongoing charging of the personal transport vehicle, and
wherein the lighting effects of the light strip of the single color of LEDs correspond to the charged personal transport vehicle and include lighting the perimeter of the deck in a second breath from the first intensity through the second intensity and back to the first intensity when the personal transport vehicle is charged.

7. The personal transport vehicle of claim 2,
wherein the lighting effects of the light strip of the single color of LEDs correspond to a selection of a mode of operation of the personal transport vehicle and include lighting the perimeter of the deck in a predetermined sequence of flashes for the selection of the mode.

8. The personal transport vehicle of claim 1,
wherein the deck lighting system built into the personal transport vehicle includes a light strip of multiple different colors of LEDs embedded in a perimeter of the deck, where the light strip of multiple different colors of LEDs is part of the one or more lights,
wherein a light control module cooperating with the light strip of the multiple different colors of LEDs is configured to cause colored lighting effects including lighting the perimeter of the deck with a constant intensity, lighting the perimeter of the deck by fading from the constant intensity, lighting the perimeter of the deck with one or more flashes from a first intensity to a second intensity, lighting the perimeter of the deck in a breath from the first intensity through the second intensity and back to the first intensity, sweeping light around the perimeter of the deck in a clockwise or counterclockwise direction, sweeping light from a front of the deck to a back of the deck simultaneously along both sides of the deck, sweeping light from the back of the deck to the front of the deck simultaneously along both sides of the deck, or a combination thereof, and
wherein the light strip of the multiple different colors of LEDs is further configured to vary in color about one or more portions of the perimeter of the deck in combination with the lighting effects.

9. The personal transport vehicle of claim 8,
wherein a light control module cooperating with motor control circuit is configured to cause the lighting effects of the light strip of the multiple different colors of LEDs to correspond to braking the personal transport vehicle and include lighting a back portion of the perimeter of the deck red and the multiple different colors of LEDs are Red Green Blue (RGB) LEDs.

10. An electrically powered personal transport system, comprising:
an electrically powered personal transport vehicle, that includes
a deck configured to support a weight of an operator standing on the deck while operating the personal transport vehicle;
one or more trucks mounted to a bottom of the deck, each of the trucks including an axle;
one or more wheels mounted on each axle of the trucks;
one or more batteries to power a motor configured to drive the wheels by way of a drive system, at least one battery of the one or more batteries disposed under a battery enclosure having a first light indicator system configured for communicative lighting for communicating with the operator; and
a deck lighting system built into the personal transport vehicle, the deck lighting system including a light strip of i) a single color of LEDs, ii) multiple different colors of LEDs, or iii) a combination of both, disposed in one or more grooves in a perimeter of the deck,
wherein one or more LEDs of the light strip are configured to communicate as follows selected from a group consisting of
i) change state of one or more of the LEDs to communicate with the operator to give the operator navigational directions,
ii) change state of one or more of the LEDs to communicate with the operator to provide the operator guidance on upcoming hazards,
iii) turn on one or more of the LEDs to externally communicate a physical presence of the personal transport vehicle and the personal transport vehicle's intended navigational route to other vehicles on a road or people on a sidewalk; and
iv) any combination of these three; and
a companion remote control for the personal transport vehicle configured to allow the operator to activate the LEDs and having a second light indicator system also configured for communicating with the operator.

11. The personal transport system of claim 10,
wherein the deck is formed of a deck core, a sidewall around a perimeter of the deck core, a top laminate over both the deck core and the sidewall, and a bottom laminate under both the deck core and the sidewall,
wherein the sidewall is formed of a top sidewall layer, a bottom sidewall layer, and a middle sidewall layer between the top sidewall layer and the bottom sidewall layer, and
wherein a first groove in the perimeter of the deck is disposed between the deck core and the middle sidewall layer as well as between the top sidewall layer and the bottom sidewall layer.

12. The personal transport system of claim 11,
wherein a light blocking film is disposed between the deck lighting system and the bottom laminate configured to block light emission from a bottom surface of the deck, and
wherein grip tape over the light strip is configured to assist in securing the light strip to the deck.

13. The personal transport system of claim 10,
wherein a light control module cooperating with the light strip of the single color of LEDs, the multiple different colors of LEDs, or a combination of both LEDs, is configured for lighting effects including lighting the perimeter of the deck with a constant intensity, lighting the perimeter of the deck by fading into the constant intensity, lighting the perimeter of the deck with one or more flashes from a first intensity to a second intensity, lighting the perimeter of the deck in a breath from the first intensity through the second intensity and back to the first intensity, sweeping light around the perimeter of the deck in a clockwise or counterclockwise direction, sweeping light from a front of the deck to a back of the deck simultaneously along both sides of the deck, sweeping light from the back of the deck to the front of the deck simultaneously along both sides of the deck, or a combination thereof.

14. The personal transport system of claim 13,
wherein the lighting effects of the light strip of the single color of LEDs is white LEDs and the multiple different colors of LEDs are RGB LEDs, where the white LEDs, the RGB LEDs, or a combination of both LEDs correspond to operations to i) indicate a powering on the personal transport vehicle, ii) indicate a powering off the personal transport vehicle, iii) cooperate with an ambient light sensor to turn on the deck lighting system and turn off the deck lighting system, iv) cooperate with a motor circuit to indicate a braking of the personal transport vehicle, v) cooperate with a battery circuit to indicate a beginning to charge the one or more batteries of the personal transport vehicle, vi) cooperate with the battery circuit to indicate ongoing charging of the batteries of the personal transport vehicle, vii) cooperate with the battery circuit to indicate a fully charged battery of the personal transport vehicle, viii) cooperate with a wireless communication circuit of the personal transport vehicle to indicate a pairing of the personal transport vehicle to an external device for wireless communication between the personal transport vehicle and the external device, ix) to indicate a mode of operation of the personal transport vehicle, or x) a combination thereof.

15. The personal transport system of claim 10,
wherein both the first light indicator system of the battery enclosure and the second light indicator system of the companion remote control includes a primary multiple different colored LED and a secondary linear LED array,
wherein the primary multiple different colored LED of the first light indicator system and the primary multiple different colored LED of the second light indicator system are configured to communicate with the operator in concert by way of the communicative lighting, and
wherein the secondary linear LED array of the first light indicator system and the secondary linear LED array of the second light indicator system are also configured to communicate with the operator in concert by way of the communicative lighting.

16. The personal transport system of claim 10,
wherein a companion mobile phone application for the personal transport vehicle resident in a mobile computing device is configured to wirelessly communicate, via a wireless communication circuit of the mobile computing device with i) a wireless communication circuit of the personal transport vehicle, ii) a wireless communication circuit of the companion remote control, or iii) any combination of both the wireless communication circuit of the personal transport vehicle and the wireless communication circuit of the companion remote control, and
wherein the companion mobile phone application is configured to turn the deck lighting system on or off and
allow the operator to select one or more operational modes for the personal transport vehicle including i) a utility mode to make settings changes to personal transport vehicle, ii) a ride mode to set acceleration and deceleration thresholds for the personal transport vehicle, and iii) a mood mode that includes a number of light based indicators to indicate any of 1) the operator's mood and 2) customize an appearance of the personal transport vehicle when those light based indicators are activated.

17. The personal transport system of claim 10, where the light strip is electrically connected to be powered through one or more access ports in a motor driver unit for the motor.

18. The personal transport system of claim 10, where the light strip is electrically connected to be powered directly from a main power bus connected to the one or more batteries.

19. The personal transport system of claim 10, where a light control module cooperating with the light strip is configured to cause the multiple different colors of LEDs to be activated automatically by an impulse from a motor driver unit when signaling breaking lights.

20. The personal transport system of claim 10, where a light control module cooperating with the light strip is configured to cause the LEDs to be activated automatically i) by sensing a shift in weight of the operator on the deck, ii) by receiving a command from the remote control and iii) any combination of both, to indicate a direction the operator intends to turn the personal transport vehicle.

21. The personal transport system of claim 10, where a light control module cooperating with an ambient light sensor is configured to receive a signal sent by the ambient light sensor to either increase or decrease an amount of lumens the LEDs need to emit depending on whether the ambient light sensor detects whether it is currently daytime, nighttime, or dusk.

* * * * *